(12) United States Patent
Bhogal et al.

(10) Patent No.: US 8,290,342 B2
(45) Date of Patent: Oct. 16, 2012

(54) MANAGING DIGITAL VIDEO RECORDER STORAGE FOR A PLURALITY OF USERS

(75) Inventors: Kulvir Singh Bhogal, Fort Worth, TX (US); Gregory Jensen Boss, Saginaw, MI (US); Rick Allen Hamilton, II, Charlottesville, VA (US); Brian Marshall O'Connell, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 737 days.

(21) Appl. No.: 12/428,903

(22) Filed: Apr. 23, 2009

(65) Prior Publication Data
US 2010/0272413 A1    Oct. 28, 2010

(51) Int. Cl.
*H04N 9/80* (2006.01)
*H04N 5/76* (2006.01)
*H04N 7/16* (2011.01)
*H04N 7/173* (2011.01)
*H04B 7/212* (2006.01)
*H04L 1/00* (2006.01)
*G06F 11/00* (2006.01)
*G06F 13/00* (2006.01)
*G06F 17/00* (2006.01)
*G06F 21/00* (2006.01)
*G06Q 30/00* (2012.01)

(52) U.S. Cl. ........ 386/248; 386/295; 235/375; 370/230; 370/252; 370/443; 705/14.27; 705/14.36; 705/59; 707/822; 711/159; 711/170; 725/58; 725/134; 725/142; 725/145; 725/151; 726/22; 726/31

(58) Field of Classification Search .................. 386/248, 386/295, E5.001; 235/375; 370/230, 252, 370/443, 468, E7.07; 705/14.27, 14.36, 59; 707/822, E17.01, E17.044; 711/159, 170; 725/58, 134, 142, 145, 151; 726/22, 31
See application file for complete search history.

(56) References Cited

U.S. PATENT DOCUMENTS

| | | | |
|---|---|---|---|
| 6,678,824 B1 * | 1/2004 | Cannon et al. ................. 726/22 |
| 7,009,992 B2 * | 3/2006 | McKinnon et al. ........... 370/443 |
| 7,289,716 B2 | 10/2007 | Gates et al. |
| 7,403,692 B2 | 7/2008 | Son |
| 7,474,832 B2 | 1/2009 | Boston et al. |
| 7,529,462 B2 | 5/2009 | Peters et al. |
| 7,529,471 B2 | 5/2009 | Boston et al. |
| 7,532,809 B2 | 5/2009 | Boston et al. |
| 7,614,069 B2 | 11/2009 | Stone |
| 7,680,993 B2 * | 3/2010 | Dougall ........................ 711/159 |

(Continued)

*Primary Examiner* — Thai Tran
*Assistant Examiner* — Syed Hasan
(74) *Attorney, Agent, or Firm* — Yee & Associates, P.C.; Mark C. Vallone

(57) ABSTRACT

A computer implemented method and apparatus for managing digital video recorder storage for one or more users. Each user in the multi-user environment is assigned an amount of program storage in the digital video recorder. Responsive to receiving a request to record a new program from a user in the multi-user environment, an associated amount of program storage assigned to the use is determined. Responsive to a determination that addition of the new program will not exceed the associated amount of program storage assigned to the user, the new program is recorded to the program storage.

25 Claims, 5 Drawing Sheets

U.S. PATENT DOCUMENTS

| | | |
|---|---|---|
| 7,805,613 B2 | 9/2010 | Apfelbaum |
| 7,895,633 B2 | 2/2011 | Van Hoff et al. |
| 2002/0138838 A1 | 9/2002 | Peters et al. |
| 2003/0231859 A1 | 12/2003 | Son |
| 2003/0237085 A1 | 12/2003 | Boston et al. |
| 2003/0237086 A1 | 12/2003 | Boston et al. |
| 2004/0006698 A1 | 1/2004 | Apfelbaum |
| 2004/0091236 A1 | 5/2004 | Boston et al. |
| 2004/0101271 A1 | 5/2004 | Boston et al. |
| 2005/0120386 A1 | 6/2005 | Stone |
| 2005/0132401 A1 | 6/2005 | Boccon-Gibod et al. |
| 2006/0118611 A1* | 6/2006 | Michelsen et al. ............ 235/375 |
| 2006/0127037 A1 | 6/2006 | Van Hoff et al. |
| 2007/0133409 A1* | 6/2007 | McKinnon et al. .......... 370/230 |
| 2008/0013919 A1 | 1/2008 | Boston et al. |
| 2008/0040751 A1* | 2/2008 | Inata et al. ..................... 725/58 |
| 2008/0172688 A1 | 7/2008 | Boston et al. |
| 2008/0212946 A1 | 9/2008 | Boston et al. |
| 2009/0074380 A1 | 3/2009 | Boston et al. |
| 2010/0191779 A1* | 7/2010 | Hinrichs ...................... 707/822 |

* cited by examiner

MANAGING DIGITAL VIDEO RECORDER STORAGE FOR A PLURALITY OF USERS

BACKGROUND

1. Field

Embodiments of the disclosure relate generally to data processing systems and in particular to data processing systems for recording video. Still more particularly, embodiments of the disclosure relate to a computer implemented method and apparatus for managing digital video recorder storage for one or more users.

2. Description of the Related Art

The digital video recorder (DVR) is an electronic device that records television programs in a digital format. The digital video recorder, also known as a personal video recorder (PVR), was first introduced into the market as a replacement for the traditional videocassette recorder (VCR). The digital video recorder operates like a small computer—the device records to a hard drive and has a consumer-friendly interface.

Typically, a digital video recorder has a video tuner card and special software that allows for television and cable shows to be recorded, edited, and archived on to a hard drive, and then backed up to optical disc. A digital video recorder may be programmed to record an unattended show, so that the user can view the show at a later time. To record an unattended show using a digital video recorder, a user programs the digital video recorder with the start and end times for a specific show, along with the channel on which the show is being broadcast. The shows that are available for recording are usually published in a guide, along with the start and end times, and the channel on which the show is being broadcast.

A user interfaces with a digital video recorder using a remote control and programs the digital video recorder through an interface screen, provided by a component in the digital video recorder, such as a content manager. The content manager uses a graphical user interface (GUI) as an interface to receive input and present output to a user.

The digital video recorder permits users to program and view recorded content through the digital video recorder unit itself. Content may comprise anything that can be sent digitally, including video or audio. Thus, content includes things that have a scheduled time for broadcasting, such as an episode of a show, a song, a movie, a music video, a documentary, or a news broadcast. Content can also be a digital picture which a user can upload. Typically, a user connects the digital video recorder unit to a television set and views the recorded content through the television set.

The digital video recorder comprises several enhancements over similar devices such as VCRs, including time shifting, chase play, instant replay, and pausing live TV. Time shifting is the recording of programming to a storage medium to be viewed or listened to at a time more convenient to the consumer. Chase play is a time shifting facility which allows a user to simultaneously watch, stop, or pause live television while continuing to record a program to its conclusion. Instant replay enables a user to quickly review recently rendered video. Pausing live TV is a feature that enables a user to stop the video and display a still frame. Often, the user may resume the video at the point they paused.

SUMMARY

Embodiments of the disclosure comprise a computer implemented method and apparatus for managing digital video recorder storage for one or more users. Each user in the multi-user environment is assigned an amount of program storage in the digital video recorder. Responsive to receiving a request to record a new program from a user in the multi-user environment, an associated amount of program storage assigned to the use is determined. Responsive to a determination that addition of the new program will not exceed the associated amount of program storage assigned to the user, the new program is recorded to the program storage.

DETAILED DESCRIPTION

Figure 1:
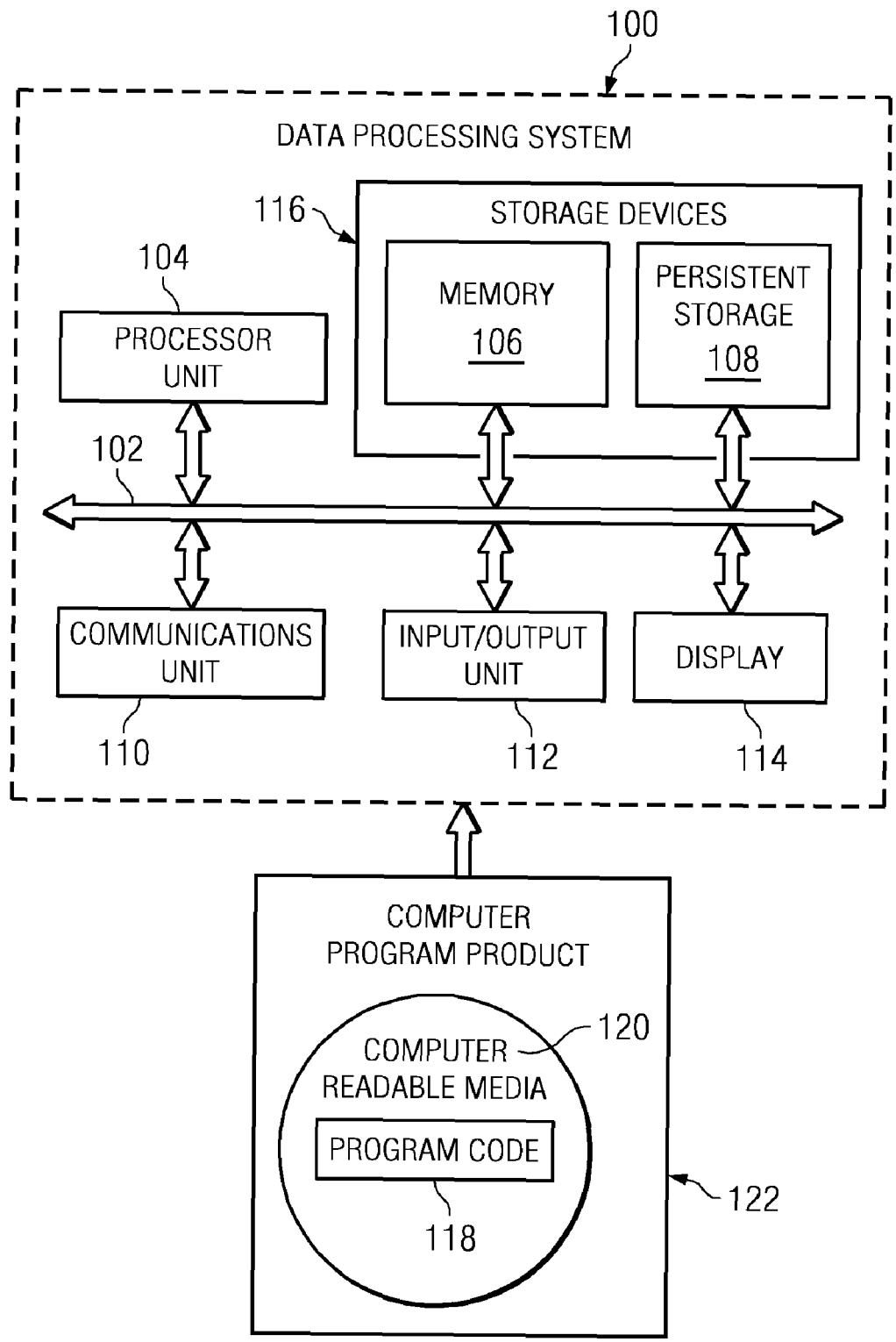
FIG. 1 is a block diagram of a data processing system in which the illustrative embodiments may be implemented.

As will be appreciated by one skilled in the art, the illustrative embodiments may be embodied as a system, method or computer program product. Accordingly, the illustrative embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the illustrative embodiments may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the illustrative embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The illustrative embodiments are described below with reference to flowchart illustrations and/or block diagrams of methods, apparatus (systems) and computer program products according to the illustrative embodiments. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Turning now to FIG. 1, a diagram of a data processing system is depicted in accordance with an illustrative embodiment. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices 116. A storage device is any piece of hardware that is capable of storing information, such as, for example without limitation, data, program code in functional form, and/or other suitable information either on a temporary basis and/or a permanent basis. Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard, a mouse, and/or some other suitable input device. Further, input/output unit 112 may send output to a printer. Display 114 provides a mechanism to display information to a user.

Instructions for the operating system, applications and/or programs may be located in storage devices 116, which are in communication with processor unit 104 through communications fabric 102. In these illustrative examples the instruction are in a functional form on persistent storage 108. These instructions may be loaded into memory 106 for execution by processor unit 104. The processes of the different embodiments may be performed by processor unit 104 using computer implemented instructions, which may be located in a memory, such as memory 106.

These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 118 is located in a functional form on computer readable media 120 that is selectively removable and may be loaded onto or transferred to data processing system 100 for execution by processor unit 104. Program code 118 and computer readable media 120 form computer program product 122 in these examples. In one example, computer readable media 120 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 120 also may take the form of a persistent storage, such as a hard drive, a thumb drive, or a flash memory that is connected to data processing system 100. The tangible form of computer readable media 120 is also referred to as computer recordable storage media. In some instances, computer readable media 120 may not be removable.

Alternatively, program code 118 may be transferred to data processing system 100 from computer readable media 120 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

In some illustrative embodiments, program code 118 may be downloaded over a network to persistent storage 108 from another device or data processing system for use within data processing system 100. For instance, program code stored in a computer readable storage medium in a server data processing system may be downloaded over a network from the server to data processing system 100. The data processing system providing program code 118 may be a server computer, a client computer, or some other device capable of storing and transmitting program code 118.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 100 is any hardware apparatus that may store data. Memory 106, persistent storage 108 and computer readable media 120 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

The illustrative embodiments allow for managing digital video storage in a multi-user environment. Presently, current art methods to delete programming from a digital video recorder are not suited to an environment in which the digital video recorder is operated by multiple parties. When a digital video recorder is used in a shared environment, such as among family members, programming retention may not be equitably applied among the users. Since digital video recorders store programs on a medium that is limited in size, if that medium is full and a new program is to be recorded, the digital video recorder will delete a previously recorded program according to a limited set of retention rules. Generally, each recorded program contains a binary flag indicating whether the program may be deleted by the digital video recorder (i.e., the program is system-removable) or whether the program must be deleted manually by the user. When a digital video recorder needs to delete a program, according to standard digital video recorder retention methods, the digital video recorder will delete the oldest system-removable program whose metadata indicates via the binary flag that the system may delete the specified recording. This standard digital video recorder retention algorithm is inequitable when a digital video recorder is used in a shared environment. The illustrative embodiments address the problems in the current art by providing a solution for equitably retaining programming when a digital video recorder is operated in a multi-user environment.

Figure 2:
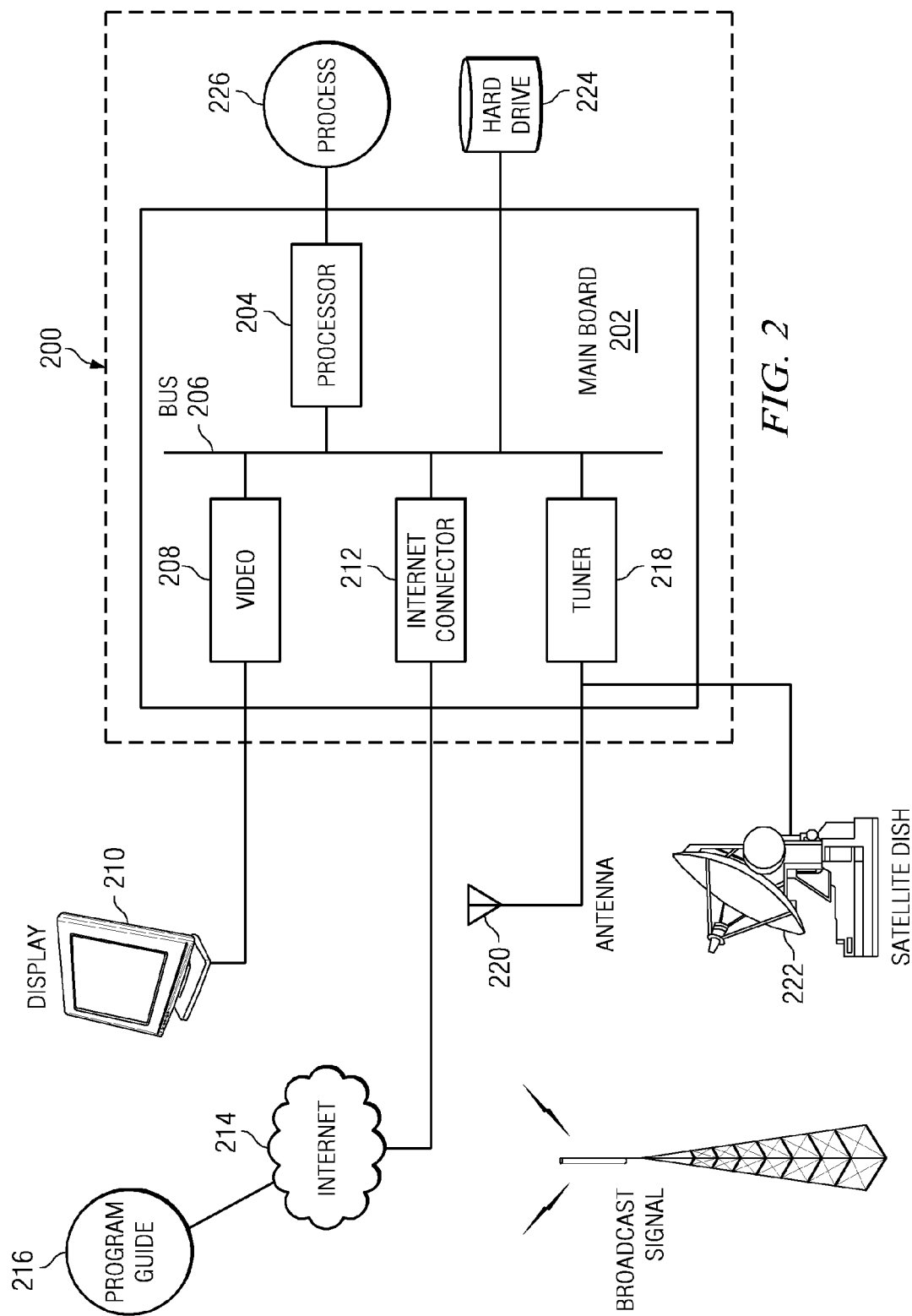
FIG. 2 is a block diagram illustrating a digital video recorder in accordance with the illustrative embodiments.

Turning now to FIG. 2, a block diagram of a digital video recorder environment in which aspects of the illustrative embodiments may be implemented is depicted. Digital video recorder 200 is implemented in this example using a computer, such as data processing system 100 in FIG. 1, and external components to which digital video recorder 200 connects. Digital video recorder 200 has specific hardware and software for recording, playing back, and archiving video broadcasts. Only relevant components of the digital video recorder are depicted in FIG. 2, and it should be understood that other components typically found in a data processing system may also be found in digital video recorder 200.

The term video refers to a signal that may contain both visual information and auditory information. The visual information may be encoded in a format such as, for example, national television system committee (NTSC), phase alternating by line (PAL), or motion picture experts group (MPEG). Similarly, the audio information may be encoded in a format such as, for example, motion picture experts group (MPEG), Dolby®, or digital theater system (DTS).

Main board 202 is a circuit board such as a computer motherboard, containing processor 204, and bus 206. Processor 204 executes software instructions and may be a processor, such as processor unit 104 in FIG. 1. Bus 206 allows the various components of main board 202 to communicate with each other, and with external components.

Video 208 is a component of main board 202 which provides a video output to an external video display, such as display 210. For example, display 210 may be a computer monitor, liquid crystal display (LCD), or a television.

Internet connector 212 is a component of main board 202 which connects main board 202 to Internet 214. For example, Internet connector 212 may be an Ethernet card that provides wired or wireless access to Internet 214.

Program guide 216 provides a way for the user to view schedules for available shows, and then select a specific show for the digital video recorder to record. In this example, program guide 216 is shown as a website on Internet 214 that provides information for programming a digital video recorder to record one or more shows. Those versed in the art will appreciate that program guide 216 may be implemented in many different ways. For example, program guide 216 may be provided through tuner 218.

Tuner 218 is a component of main board 202 which connects to an external video signal. In this example, antenna 220 and satellite dish 222 are shown as providing an external video signal to main board 202. Video 208, Internet connector 212, and tuner 218 may be built in to main board 202. Alternately, video 208, Internet connector 212, and tuner 218 may be connected to main board 202 using the Personal Computer Interface (PCI) bus, or the Universal Serial Bus (USB).

Hard drive 224 is attached to bus 206, and is used to record, store, and playback video programs. Process 226 may comprise a software or firmware program which provides the user with an interface for recording programs, playing back previously recorded programs, and storing programs on a hard drive. Process 226 may be a special software process that provides a user interface along with digital video recorder functions. For example, process 226 may allow the user to view a schedule of available shows, search or filter the available shows using the user's preferences, and then select shows for recording on to hard drive 224.

Process 226 may allow the user to record shows in many different ways. For example, process 226 may allow the user to manually enter a start time, an end time, and a channel on which to receive the show. Process 226 uses the channel to set tuner 218 so that tuner 218 can receive the specified show.

Alternately, the user may browse program guide 216, and select and click on a show. When the user clicks on a show in program guide 216, information about the show, and the action to be taken, may be provided to process 226 to schedule the show for recording. For example, when a user selects a show in program guide 216, program guide 216 may provide the selected show's start time, end time, and channel number, along with an indication that the show should be recorded to process 226. Process 226 then sets itself to record the selected show.

Process 226 also manages program retention in a multi-user environment by assigning user quotas, using genre-based retention, assigning retention credits to users, and using user-based usage tracking. These program retention methods define how recorded programs will be retained on digital video recorder 200 in an equitable manner for each user of the digital video recorder.

Per User Quotas

The per user quota retention policies modify the standard video retention policy in digital video recorder 200. The per user quota retention policies are enacted prior to commencement of recording a new program.

A digital video recorder user or administrator may assign quotas to each user of the digital video recorder 200, such that each user is allocated a set amount of storage space in hard drive 224. For example, if digital video recorder 200 is shared by four users and has a storage capacity of 400 gigabytes in hard drive 224, the administrator may assign 100 gigabytes of storage to each user. It should be noted that the administrator is not required to assign equal storage per user. For instance, the administrator may allocate 200 gigabytes of storage for one user, 100 gigabytes of storage for a second user, and 50 gigabytes of storage for the two remaining users. In an alternative embodiment, the administrator may assign user quotas by percentages, rather than by absolute storage space allocations.

Not all of the storage space in hard drive 224 is required to be assigned to individual users and their allotted quotas. An amount of storage in hard drive 224 may be used to store quota-exempt programs. These quota-exempt programs may comprise programs which some or all of the users in the multi-user environment may want to watch, such as for example, the Academy Awards or the Super Bowl. The administrator may allow all (or some) users to record to the quota-exempt storage space. The quota-exempt programs may be retained according to standard digital video recorder retention rules.

With the per user quota retention method, a user may record programming up to the user's assigned storage quota. These recorded programs will be retained in hard drive 224 until that user deletes the programs or records new programs over the user's old programs. A user may be allowed to exceed the user's assigned quota in some instances if another user of the system has available storage. This "borrowing" of unused media permits optimal use of the digital video recorder storage, while still enforcing equitable programming retention for each user. If no other available storage exists, however, the user cannot exceed the user's assigned quota. Consequently, programs recorded and retained for each user are managed in an equitable manner across the group of users.

To support per user quotas, digital video recorder 200 is augmented to require each user of the digital video recorder to associate the user's program recording requests with the user's unique identifier. Requiring a user to provide the user's identification when selecting a program for recording enables the selected program to be associated with the requesting user. Additionally, if digital video recorder 200 is capable of recording "suggested" programming, digital video recorder 200 automatically associates each suggested recording with a particular user identification. The digital video recorder may then use the user identification to determine whether to allow the requesting user to record a requested program based on the user's quota and available storage space. Digital video recorder 200 may optionally require a user to supply a password prior to recording a program to digital video recorder 200. Likewise, digital video recorder 200 may optionally require an owner of a recorded program to supply a password prior to deleting a program from digital video recorder 200. These optional augmentations prevent quota "cheating" in embodiments that permit a user to exceed their quota and "borrow" storage space assigned to another user of the system if the other user has available storage.

Genre-Based Retention

The genre-based retention policies modify the standard video retention policy in digital video recorder 200. The genre-based retention policies are enacted prior to commencement of recording a new program. The genre-based retention policies may also be used in conjunction with other retention policies in the multi-user environment.

In the genre-based retention method, a user or administrator of digital video recorder 200 may rank program genres in order of retention preference for a user. In other words, each user ranks genres according to the importance the user places on retaining programming in a particular genre. Program genres may include, but are not limited to, movies, sports, comedy, drama, etc. As new programs are recorded onto hard drive 224, the user's storage space may be filled to capacity. Those recorded programs in a genre ranked lowest by the user will be deleted first from storage to accommodate newly recorded programs. The lowest ranked program having the earliest recording date may be deleted from storage first, and the remaining recorded programs in the genre may also be deleted in order as needed. Programs in the next lowest ranked genre may also be deleted as storage space is needed.

A user may set the user's genre preferences using the digital video recorder user interface, a web interface, or other interface that enables communications between the user and the digital video recorder. Each genre ranking set by a user is discrete, such that, for each user, no genre may have the same rank. A user may not be required to rank all genres. In this situation, ranked genres are automatically given retention preference over those genres that have not been ranked.

To support genre-based retention, digital video recorder 200 is augmented to enable a user or administrator to rank program genres in order of each user's retention preference. For example, one user may prefer sports programs to movies. Another user may prefer comedy programs to drama programs. The genre options provided to a user may be limited to genres that are known to digital video recorder 200. For instance, most digital video recorders comprise genre information which is transmitted as part of the electronic programming guide, and all programming received by digital video recorder 200 is categorized into one or more genres.

The genre-based retention may also be enhanced by setting a minimum amount of time a newly recorded program is retained before the program is available for deletion. This enhancement addresses the problem of having programs which fall within the lowest ranked genre always being deleted first from the digital video recorder, and thus having little chance of being retained for more than a few hours. Consider, for example, the following scenario. A user ranks program genres in the following order: sports=1, comedy=2, drama=3. The user has recorded three programs in each genre, and storage space in hard drive 224 is now at capacity. If the user wants to record three new programs, one in each of the three genres, the digital video recorder will delete the three old drama programs. Consequently, the storage space comprises four sports programs, four comedy programs, and one drama program. Even though the drama program is newly recorded, if the user records another sports or comedy program, the drama program will still be deleted. Thus, programs in the lowest ranked genre may have a short time to live.

To balance the genre ranking and time to live (TTL), a threshold may be created to further define a minimum retention period of programs in storage. For instance, a minimum time to live value may be set that overrides genre-based deletion. If the time to live value is, for example, 48 hours, a program is only eligible for deletion in the genre-based deletion process if the program is older than 48 hours. Alternatively, a corresponding percentage or weight may be assigned to each genre priority. For instance, the user may assign the sports genre a value of 10 (highest), the comedy genre a value of 8, and the drama genre a value of 3. The percentage of storage space allotted to programs in the sports genre is 10/(10+8+3)=47%. The percentage of storage space allotted to programs in the comedy genre is 8/(10+8+3)=38%. The percentage of storage space allotted to programs in the drama genre is 3/(10+8+3)=14%. Thus, for the lowest ranked genre, drama, there will always be 14% of space available for drama programs. If the amount of drama programs exceeds the 14% of space allotted to the drama genre, the programs become eligible for deletion based on the genre-based deletion process.

Retention Credit Allocation

The retention credit allocation policies modify the standard video retention policy in digital video recorder 200. The retention credit allocation policies are enacted prior to commencement of recording a new program.

A digital video recorder user or administrator may assign a number of retention "credits" to each user of the digital video recorder 200. For example, if a digital video recorder is shared by four users, the administrator may assign 100 retention credits to each user. The administrator is not required to assign an equal number of retention credits per user. For instance, the administrator may allocate 200 credits to one user, 100 credits for a second user, and 50 credits for the two remaining users. Each user may assign the user's retention credit allotment to the user's previously recorded programming and to the user's scheduled program recording. For example, a user assigns 10 retention credits to a recorded program, while another user assigns 15 retention credits to a different recorded program. If the digital video recorder must delete programming to record a new program, the digital video recorder will delete the program with lesser number of credits (e.g., the program with 10 credits). When a program is deleted from the digital video recorder, the user associated with the program may receive the credits which were allocated to that program for use on other programs.

To support retention credit allocation, digital video recorder 200 is augmented to require each user of the digital video recorder to associate a user's program recording requests with the user's unique identifier. Requiring a user to provide the user's identification when selecting a program for recording enables the selected program to be associated with the requesting user. Additionally, if digital video recorder 200 is capable of recording "suggested" programming, digital video recorder 200 automatically associates each suggested recording with a particular user identification. Programming deletion rules in digital video recorder 200 may optionally require a user to supply a password prior to deleting a program in embodiments that permit a user to exceed their quota if another user has available space to prevent quota cheating.

It should be obvious to those that are skilled in the art that numerous modification and substitutions are possible without deviating from the core of this inventive method. For example, the calculations that assign weighting via credit allocation to each program may be augmented to include the length of the program. In such an embodiment, if a 3 hour long program is assigned 15 retention credits, the program has an average of 5 credits per time unit. If another program is 1 hour long and is assigned 10 retention credits, the program has an average of 10 credits per time unit. In this scenario, the program with 15 credits (5 credits per time unit) is eligible for deletion before the program with 10 credits (10 credits per time unit).

There are various ways of providing retention credits to users and replenishing the credits as they are used. Static credit allocation provides a set number of credits to a user. Once these credits are used by the user, the credits cannot be reused. Static credit allocation may be too limiting in most circumstances, and thus may be employed with time-based credit allocation.

Time-based credit allocation provides a user with a set number of credits over a specific time period. For instance, a user may be given 100 credits to use over a 30 day period. Once the credits are used, the user may not receive any more credits until the next 30 day period. During the next 30 day period, the user is allocated another 100 credits. The time-based credit allocation may also allow carry over of unused credits to the next time period.

Fluid credit allocation provides a user with a set number of credits which are always available to the user. When the user uses up all of the user's allotted credits, the user may delete recorded programs in the user's list to be credited to the credits which were allocated to those programs. The user may then use these reallocated credits on other programs.

Percentage-based credit allocation provides a user with a percentage of a total number of assigned credits. The credits assigned to a program may change depending on how many other recorded programs are protected under the same user account. For example, a user has four programs which are assigned the following number of credits respectively—50, 30, 10, and 10. In a 100 credit allocation, program 1 is assigned 50/(50+30+10+10)=50% of 100 credits, or 50 credits. If program 2 is deleted, the 30 credits assigned to program 2 are redistributed to the other three programs. Program 1 will subsequently be assigned 50/(50+10+10)=71% of 100 credits, or 71 credits. Thus, the remaining shows may take advantage of the unused portion of allocated credits. The user may add another program at any time and assign the new program a weight value. The credit allocation for each program will subsequently be redistributed based on percentages.

User Usage Tracking

The user usage tracking retention policies modify the standard video retention policy in digital video recorder 200. The user usage tracking retention policies are enacted prior to commencement of recording a new program. The user usage tracking retention policies may also be used in conjunction with other retention policies in the multi-user environment.

A digital video recorder tracks the recording to viewing ratio for each user. The recording to viewing ratio describes the number of programs recorded by the user as compared to the number of recordings explicitly deleted by the user without viewing or deleted by the digital video recorder prior to viewing. The particular actions that comprise "viewing" of a recorded program may be embodiment dependant. For instance, some embodiments may consider playing any part of a recorded program as viewing, while other embodiments may require the user to view the program in its entirety. The user usage tracking retention policies utilize a user's recording to viewing ratio to determine when to delete programming when space is needed. Programs associated with a user having a highest recording to viewing ratio in relation to the other user will be deleted when space is required.

To support user usage tracking, digital video recorder 200 is augmented to require each user of the digital video recorder to associate the user's program recording requests with the user's unique identifier. Additionally, if the digital video recorder is capable of recording "suggested" programming, the digital video recorder automatically associates each suggested recording with a particular user identification. Additionally, the retention policy for the DVR must be augmented to utilize user usage tracking data. The digital video recorder must be enhanced to track each user's recording to viewing ratio.

Figure 3:
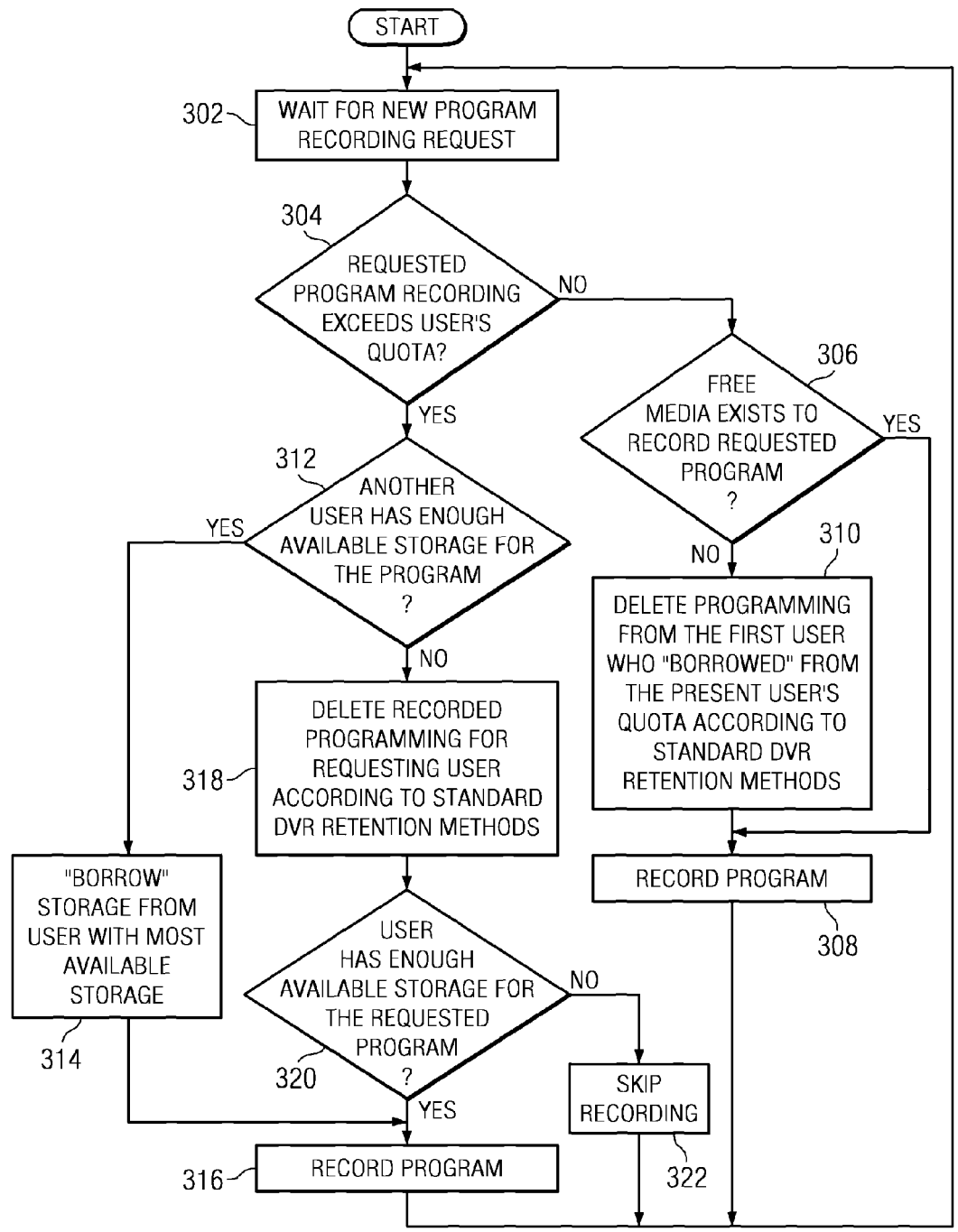
FIG. 3 is a flowchart of a process in a digital video recorder for assigning usage quotas to users in accordance with the illustrative embodiments.

FIG. 3 is a flowchart of a process in a digital video recorder for assigning usage quotas to users in accordance with the illustrative embodiments. The flowchart in FIG. 3 is executed by a software or firmware process, such as process 226 in FIG. 2, in a digital video recorder, such as digital video recorder 200 in FIG. 2.

The process begins with process 226 in FIG. 2 waiting until a new program recording request is detected (process block 302). When a new program is to be recorded for a current user, a determination is made by the process as to whether the program to be recorded by the user exceeds the user's assigned recording quota in the digital video recorder (process block 304). If the program to be recorded does not exceed the user's assigned recording quota ('no' output of process block 304), a determination is made as to whether free media (i.e., available hard drive space) currently exists in the digital video recorder to record the requested program (process block 306). If free media exists ('yes' output of process block 306), the process records the program (process block 308). The process then returns to block 302 to wait for the next program to be recorded. If no free media exists ('no' output of process block 306), the process deletes programming from the first user who "borrowed" from the present user's usage quota according to standard digital video recorder retention methods (process block 310). The process then records the programming for the current user (process block 308). The process then returns to block 302 to wait for the next program to be recorded.

Turning back to block 304, if the program to be recorded exceeds the user's assigned recording quota ('yes' output of process block 304), a determination is made as to whether another user of the digital video recorder has enough available storage space for the current user's program (process block 312). If another user of the digital video recorder has available storage space for the current user's program ('yes' output of process block 312), the process "borrows" storage from the user with the most available storage space (step 314). The process then records the requested program for the current user (process block 316). The process then returns to block 302 to wait for the next program to be recorded.

Turning back to block 312, if another user of the digital video recorder does not have available storage space for the current user's program ('no' output of process block 312), the process deletes recorded programming from the user's storage space according to standard digital video recorder retention methods (process block 318). For example, the process may delete the oldest recorded program in the user's storage. The process then makes a determination as to whether the user now (after deletion) has enough available storage for the requested program (process block 320). If the user now has enough available storage for the requested program ('yes' output of process block 320), the process records the programming for the user (process block 316). The process then returns to block 302 to wait for the next program to be recorded.

Turning back to process block 320, if the user does not have enough available storage for the requested program ('no' output of process block 320), the process skips recording the requested program for the user (process block 322), and returns to block 302 to wait for the next program to be recorded.

Figure 4:
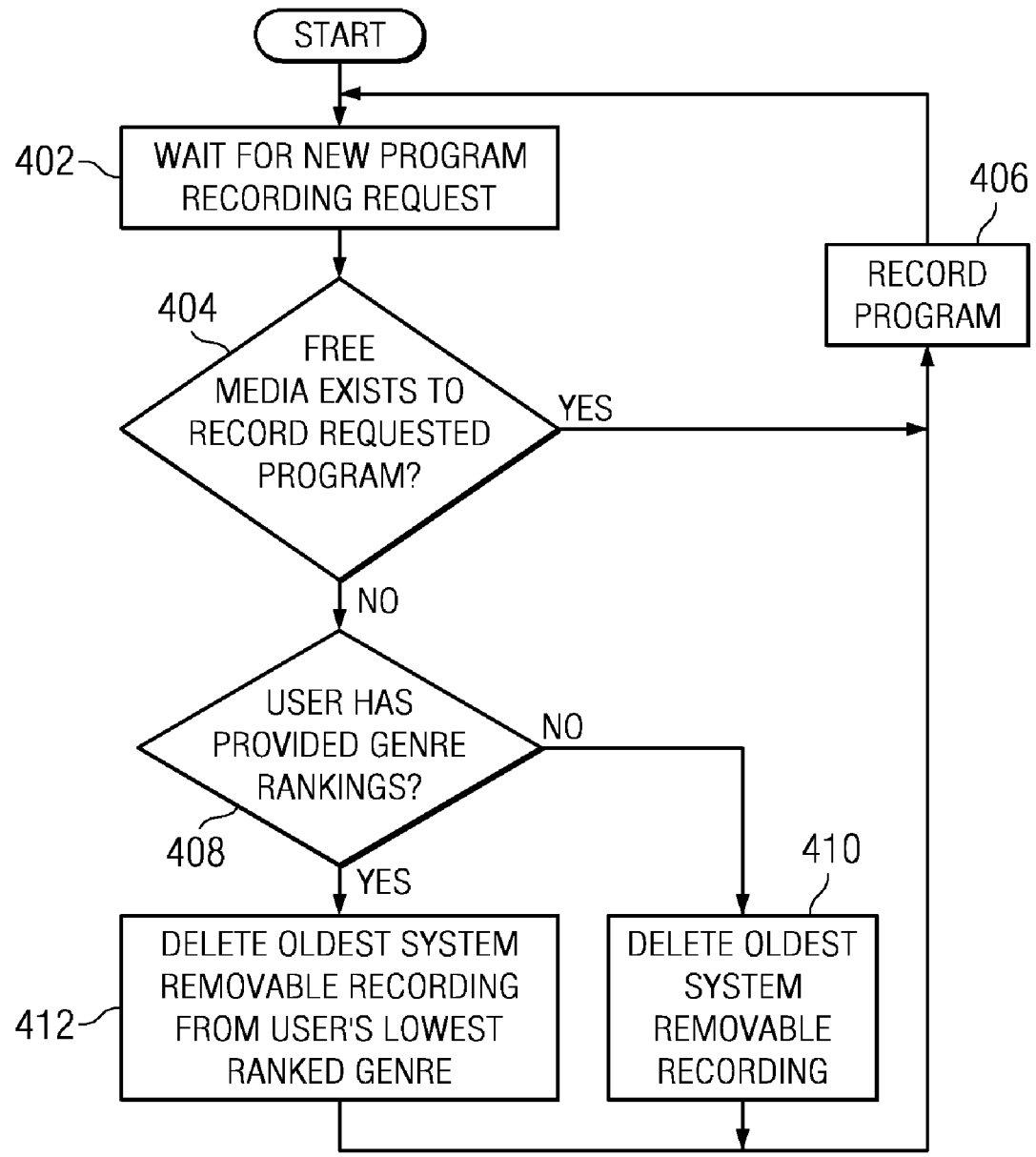
FIG. 4 is a flowchart of a process in a digital video recorder for using rankings for genre-based retention in accordance with the illustrative embodiments.

FIG. 4 is a flowchart of a process in a digital video recorder for using rankings for genre-based retention in accordance with the illustrative embodiments. The flowchart in FIG. 4 is executed by a software or firmware process, such as process 226 in FIG. 2, in a digital video recorder, such as digital video recorder 200 in FIG. 2.

The process begins with process 226 in FIG. 2 waiting until a new program recording request is detected (process block 402). When a new program is to be recorded for a current user, a determination is made as to whether free media (i.e., available hard drive space) currently exists in the digital video recorder to record the requested program (process block 404). If free media exists ('yes' output of process block 404), the process records the program (process block 406). The process then returns to block 402 to wait for the next program to be recorded.

Turning back to process block 404, if no free media exists ('no' output of process block 404), the process makes a determination as to whether the user has provided genre rankings (process block 408). A user's genre rankings indicate the importance the user places on retaining a program in a particular programming genre. If the user has not provided any genre rankings ('no' output of process block 408), the process deletes the oldest system-removable recorded program (process block 410). The process then records the program (process block 406), and returns to block 402 to wait for the next program to be recorded. If the user has provided genre rankings ('yes' output of process block 408), the process deletes the oldest system-removable recorded program from the user's lowest ranked genre (process block 412). The process then records the program (process block 406), and returns to block 402 to wait for the next program to be recorded.

Figure 5:
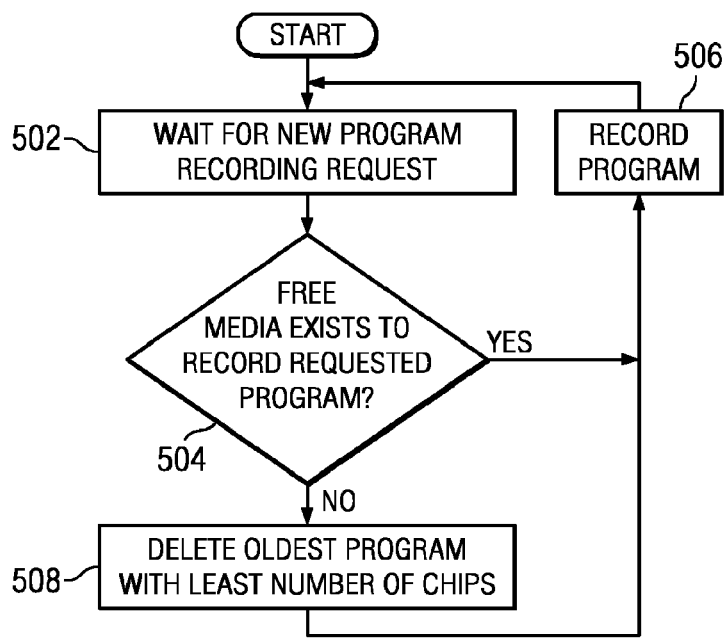
FIG. 5 is a flowchart of a process in a digital video recorder for assigning retention credits to users in accordance with the illustrative embodiments.

FIG. 5 is a flowchart of a process in a digital video recorder for assigning retention credits to users in accordance with the illustrative embodiments. The flowchart in FIG. 5 is executed by a software or firmware process, such as process 226 in FIG. 2, in a digital video recorder, such as digital video recorder 200 in FIG. 2.

The process begins with process 226 in FIG. 2 waiting until a new program recording request is detected (process block 502). When a new program is to be recorded for a current user, a determination is made as to whether free media (i.e., available hard drive space) currently exists in the digital video recorder to record the requested program (process block 504). If free media exists ('yes' output of process block 504), the process records the program (process block 506). The process then returns to block 502 to wait for the next program to be recorded.

Turning back to process block 504, if no free media exists ('no' output of process block 504), the process deletes the oldest program comprising the least number of retention credits (process block 508). The process then records the programming for the current user (process block 506). The process then returns to block 502 to wait for the next program to be recorded.

Figure 6:
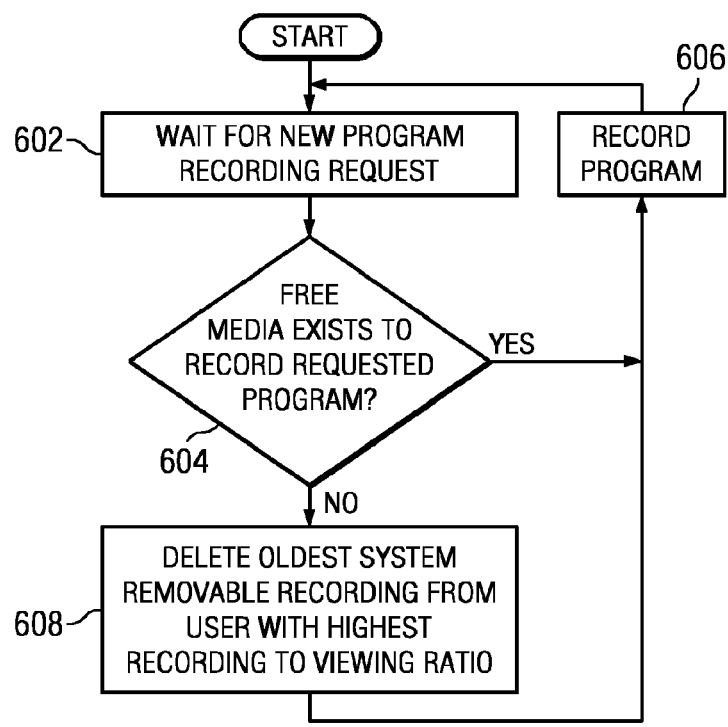
FIG. 6 is a flowchart of a process in a digital video recorder for tracking user usage in accordance with the illustrative embodiments.

FIG. 6 is a flowchart of a process in a digital video recorder for tracking user usage in accordance with the illustrative embodiments. The flowchart in FIG. 6 is executed by a software or firmware process, such as process 226 in FIG. 2, in a digital video recorder, such as digital video recorder 200 in FIG. 2.

The process begins with process 226 in FIG. 2 waiting until a new program recording request is detected (process block 602). When a new program is to be recorded for a current user, a determination is made as to whether free media (i.e., available hard drive space) currently exists in the digital video recorder to record the requested program (process block 604). If free media exists ('yes' output of process block 604), the process records the program (process block 606). The process then returns to block 602 to wait for the next program to be recorded.

Turning back to process block 604, if no free media exists ('no' output of process block 604), the process deletes the oldest system-removable program from the user with the highest recording to viewing ratio (process block 608). The process then records the programming for the current user (process block 608). The process then returns to block 602 to wait for the next program to be recorded.

The flowchart and block diagrams in the Figures illustrate the architecture, functionality, and operation of possible implementations of systems, methods and computer program products according to the various illustrative embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the illustrative embodiments has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The embodiments of the disclosure can take the form of an entirely hardware embodiment, an entirely software embodiment or an embodiment containing both hardware and software elements. In a preferred embodiment, the disclosure is implemented in software, which includes but is not limited to firmware, resident software, microcode, etc.

Furthermore, the embodiments of the disclosure can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the embodiments of the disclosure has been presented for purposes of illustration and description, and is not intended to be exhaustive or limited to the embodiments in the form disclosed. Many modifications and variations will be apparent to those of ordinary skill in the art. The embodiment was chosen and described in order to best explain the principles of the disclosure, the practical application, and to enable others of ordinary skill in the art to understand the disclosure for various embodiments with various modifications as are suited to the particular use contemplated.

What is claimed is:

1. A method for managing program retention in a multi-user environment, the method comprising:
   a digital video recorder assigning each user in the multi-user environment an amount of program storage in the digital video recorder;
   responsive to receiving a request to record a first program from a user in the multi-user environment, the digital video recorder determining an associated amount of the program storage assigned to the user;
   responsive to a determination that recording the first program to the associated amount of the program storage assigned to the user will not exceed the associated amount of the program storage assigned to the user, the digital video recorder recording the first program to the program storage;
   the digital video recorder calculating a recording to viewing ratio for each user;
   the digital video recorder determining a user having a highest recording to viewing ratio; and
   the digital video recorder deleting a recorded program associated with the user having the highest recording to viewing ratio.

2. The method of claim 1, further comprising:
   responsive to a determination that recording a second program to the associated amount of the program storage assigned to the user will exceed the associated amount of the program storage assigned to the user, the digital video recorder rejecting a request to record the second program.

3. The method of claim 1, further comprising:
   responsive to a determination that recording a second program to the associated amount of the program storage assigned to the user will exceed the associated amount of the program storage assigned to the user, the digital video recorder identifying a second user in the multi-user environment with available program storage; and
   the digital video recorder recording the second program to the available program storage of the second user.

4. The method of claim 1, further comprising:
   responsive to a determination that recording a second program to the associated amount of the program storage assigned to the user will exceed the associated amount of the program storage assigned to the user, the digital video recorder deleting a recorded program of another user.

5. The method of claim 1, wherein the recording step is performed further in response to the digital video recorder determining that the associated amount of the program storage assigned to the user has available space to store the first program.

6. The method of claim 1, wherein the digital video recorder assigning each user in the multi-user environment an amount of program storage space in the digital video recorder comprises:
   the digital video recorder assigning an equal amount of program storage space to each user in the multi-user environment.

7. The method of claim 1, wherein the digital video recorder assigning each user in the multi-user environment an amount of program storage space in the digital video recorder comprises:
   the digital video recorder assigning different amounts of program storage space to each user in the multi-user environment.

8. The method of claim 1, wherein the digital video recorder assigning each user in the multi-user environment an amount of program storage space in the digital video recorder comprises:
   the digital video recorder assigning a percentage of program storage space to each user in the multi-user environment.

9. A method for managing program retention in a multi-user environment, the method comprising:
   a digital video recorder receiving a request to record a program in the digital video recorder from a requesting user in the multi-user environment;
   the digital video recorder determining if program storage assigned to the requesting user in the digital video recorder contains sufficient space to store the program;
   responsive to a determination that the program storage assigned to the requesting user does not contain sufficient space to store the program, the digital video recorder identifying a program genre ranked lowest by the requesting user in order of retention preference;
   the digital video recorder deleting a recorded program of the lowest-ranked program genre;
   the digital video recorder recording the program to the program storage;
   the digital video recorder calculating a recording to viewing ratio for each user in the multi-user environment;
   the digital video recorder determining a user having a highest recording to viewing ratio; and
   the digital video recorder deleting a recorded program associated with the user having the highest recording to viewing ratio.

10. The method of claim 9, further comprising:
    responsive to a determination that the requesting user has not ranked any program genres, the digital video recorder deleting a recorded program from the program storage; and
    the digital video recorder recording the program to the program storage.

11. The method of claim 9, further comprising:
    the digital video recorder assigning a time to live value in the program storage indicating a minimum amount of time a recorded program is retained before the recorded program is available for deletion; and
    the digital video recorder overriding deletion of the recorded program from the lowest-ranked program genre if the time to live value of the recorded program has not been met.

12. The method of claim 9, further comprising:
    the digital video recorder assigning a priority percentage to each program genre ranked by the requesting user indicating a minimum amount of storage available for recorded programs within a program genre; and
    the digital video recorder overriding deletion of recorded programs from the lowest-ranked program genre if the percentage of storage available to the lowest-ranked program genre has not been exceeded.

13. A method for managing program retention in a multi-user environment, the method comprising:
    a digital video recorder allocating each user in the multi-user environment a number of retention credits;
    responsive to receiving a request to record a first program from a requesting user in the multi-user environment, the digital video recorder determining if program storage assigned to the requesting user in the digital video recorder contains sufficient space to store the first program;

responsive to a determination that the program storage assigned to the requesting user does not contain sufficient space to store the first program, the digital video recorder identifying a recorded program in the program storage assigned to the requesting user that has been assigned a least amount of retention credits by the requesting user;

the digital video recorder deleting the recorded program from the program storage assigned to the requesting user;

the digital video recorder recording the first program to the program storage;

the digital video recorder calculating a recording to viewing ratio for each user in the multi-user environment;

the digital video recorder determining a user having a highest recording to viewing ratio; and the digital video recorder deleting a recorded program associated with the user having the highest recording to viewing ratio.

14. The method of claim 13, wherein the digital video recorder identifying a recorded program that has been assigned a least amount of retention credits by the requesting user comprises:

the digital video recorder calculating a retention value per time unit for each individual recorded program in the program storage based on a number of retention credits assigned to an individual recorded program and a time length of the individual recorded program; and the digital video recorder determining the recorded program that has been assigned a least amount of retention credits by the requesting user as a recorded program with a lowest calculated retention value per time unit.

15. The computer implemented method of claim 13, further comprising:

responsive to deleting the recorded program, the digital video recorder allocating retention credits assigned to the deleted recorded program to the requesting user.

16. The method of claim 13, wherein the digital video recorder allocating each user in the multi-user environment a number of retention credits comprises:

the digital video recorder allocating a user a set number of retention credits over a specific time period.

17. The method of claim 13, wherein the digital video recorder allocating each user in the multi-user environment a number of retention credits comprises:

the digital video recorder allocating a percentage of a total number of retention credits to a user.

18. The method of claim 17, further comprising:

responsive to deleting a recorded program in the program storage assigned to the requesting user, the digital video recorder reallocating retention credits assigned to the deleted recorded program to recorded programs remaining in the program storage based on individual percentages assigned to each remaining recorded program.

19. The method of claim 17, further comprising:

responsive to recording the program in the program storage assigned to the requesting user, the digital video recorder reallocating retention credits assigned to recorded programs in the program storage based on individual percentages assigned to the program and the recorded programs.

20. The method of claim 13, wherein the digital video recorder identifying a recorded program assigned a least amount of retention credits by the requesting user comprises:

the digital video recorder receiving, from the requesting user, a user identifier; and the digital video recorder determining that the recorded program is associated with the user identifier.

21. A method for managing program retention in a multi-user environment, the method comprising:

a digital video recorder determining a number of programs recorded by a first user in the multi-user environment;

the digital video recorder determining a number of programs deleted from a program storage without having been viewed by the first user;

the digital video recorder calculating a recording to viewing ratio for the first user;

responsive to receiving a request to record a program from a user in the multi-user environment, the digital video recorder comparing an associated recording to viewing ratio of each user in the multi-user environment to identify a user having a highest recording to viewing ratio;

the digital video recorder deleting a recorded program associated with a particular user having the highest recording to viewing ratio; and the digital video recorder recording the program to the program storage.

22. The method of claim 21, wherein the digital video recorder determining a number of programs deleted from a program storage without having been viewed by the first user comprises:

the digital video recorder determining a first program has been viewed if the first program has been viewed in its entirety by the first user.

23. The method of claim 21, wherein the digital video recorder determining a number of programs deleted from a program storage without having been viewed by the first user comprises:

the digital video recorder determining a first program has been viewed if a portion of the first program has been viewed by the first user.

24. The method of claim 21, wherein the digital video recorder performs the comparing and deleting steps in response to a determination that the program storage does not contain available space to store the program.

25. The method of claim 21, wherein the digital video recorder determining a number of programs recorded by a first user in the multi-user environment comprises:

the digital video recorder receiving, from the first user, a user identifier; and the digital video recorder determining a number of programs associated with the user identifier.

* * * * *